(12) United States Patent
Hotta

(10) Patent No.: US 9,536,300 B2
(45) Date of Patent: *Jan. 3, 2017

(54) IMAGE PROCESSING METHOD, IMAGE PROCESSING SYSTEM, AND STORAGE MEDIUM STORING IMAGE PROCESSING PROGRAM

(71) Applicant: HAMAMATSU PHOTONICS K.K., Hamamatsu-shi, Shizuoka (JP)

(72) Inventor: Kazuhiro Hotta, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,507

(22) Filed: Dec. 24, 2014

(65) Prior Publication Data

US 2015/0187058 A1     Jul. 2, 2015

Related U.S. Application Data

(60) Provisional application No. 61/920,820, filed on Dec. 26, 2013.

(51) Int. Cl.
  *G06T 7/00*  (2006.01)
  *G06K 9/48*  (2006.01)
  (Continued)

(52) U.S. Cl.
  CPC ............... *G06T 7/001* (2013.01); *G06K 9/48* (2013.01); *G06K 9/52* (2013.01); *G06K 9/6201* (2013.01);
  (Continued)

(58) Field of Classification Search
  None
  See application file for complete search history.

(56) References Cited

U.S. PATENT DOCUMENTS

2003/0152276 A1   8/2003  Kondo et al.
2007/0011519 A1*  1/2007  Takeda .................. G01N 21/956
                                                           714/724
(Continued)

FOREIGN PATENT DOCUMENTS

JP    H7-311168    11/1995
JP    H11-016974    1/1999
(Continued)

OTHER PUBLICATIONS

International Preliminary Report on Patentability issued Jul. 7, 2016 in International Application No. PCT/JP2014/0080093.
(Continued)

*Primary Examiner* — Siamak Harandi
*Assistant Examiner* — Amandeep Saini
(74) *Attorney, Agent, or Firm* — Drinker Biddle & Reath LLP

(57) ABSTRACT

An image processing method in an observation system 1A includes a step of acquiring a measured image $G_1$ measured from a semiconductor device S and a first pattern image $G_2$ showing a pattern of the semiconductor device S corresponding to the measured image $G_1$, a step of acquiring a second pattern image $G_3$ showing a pattern of the semiconductor device S, a step of acquiring matching information indicating a correlation of the first pattern image $G_2$ and the second pattern image $G_3$ based on the first pattern image $G_2$ and the second pattern image $G_3$, and a step of superimposing the second pattern image $G_3$ and the measured image $G_1$ based on the matching information to acquire a superimposed image $G_4$.

13 Claims, 12 Drawing Sheets

(51) Int. Cl.
*G06K 9/62* (2006.01)
*G06K 9/52* (2006.01)
(52) U.S. Cl.
CPC ................ *G06T 2207/10048* (2013.01); *G06T 2207/30148* (2013.01)

(56) References Cited

U.S. PATENT DOCUMENTS

2007/0019858 A1  1/2007  Shimura
2011/0268363 A1* 11/2011  Osaki ................ G03F 7/70633
                                            382/209

FOREIGN PATENT DOCUMENTS

JP      2005-310805 A   11/2005
WO    WO 2006/137415   12/2006

OTHER PUBLICATIONS

International Preliminary Report on Patentability issued Jul. 7, 2016 in International Application No. PCT/JP2014/080096.

* cited by examiner

IMAGE PROCESSING METHOD, IMAGE PROCESSING SYSTEM, AND STORAGE MEDIUM STORING IMAGE PROCESSING PROGRAM

CROSS-REFERENCE TO RELATED APPLICATION

This application claims priority to Provisional Application Ser. No. 61/920,820 filed on Dec. 26, 2013, which is hereby incorporated by reference in its entirety.

BACKGROUND OF THE INVENTION

1. Field of the Invention

The present invention relates to an image processing method, an image processing system, and a storage medium storing an image processing program.

2. Related Background Art

Conventionally, an image of a device under test (DUT) such as a semiconductor device has been acquired, and various types of analysis such as an analysis of a failure point have been performed based on the image. For example, the following patent document 1 discloses a measurement device including a scanning electron microscope for measuring the line width of a circuit pattern formed on a semiconductor wafer. In this device, position detection in an observation image is performed using a template.

CITATION LIST

Patent Literature

Patent Document 1: Japanese Patent Application Laid-Open No. 2005-310805

SUMMARY OF THE INVENTION

Technical Problem

Here, there has been an increased demand, when analyzing a measured image such as a photo emission or thermal emission from a device under test, for generating an image that is overlapped with a pattern image of the device under test acquired separately from the measured image. In that case, the accuracy of alignment between the pattern image and a signal image including the measured image is important. However, a photo emission image or thermal emission image of a device under test does not include a circuit pattern of the device under test in most cases, and for example, when an image with a thermal image is used as a measured image, alignment of the center of a pattern image with the center of a signal image has been performed by acquiring a pattern image with a stage adjusted such that the thermal image is located in the center of the measured image. With such a method, the accuracy of alignment is poor, which causes difficulty when acquiring a signal image and a pattern image.

Therefore, the present invention has been made in view of such problems, and it is an object of the present invention to provide an image processing method, image processing apparatus, and image processing program capable of accurately generating a superimposed image of a measured image such as a photo emission or thermal emission of a semiconductor device and its pattern image.

Solution to Problem

In order to solve the above-described problems, a method according to an aspect of the present invention is a method for superimposing a measured image measured from a semiconductor device and a pattern image showing a pattern of the semiconductor device, and includes acquiring the measured image and a first pattern image showing a pattern of the semiconductor device corresponding to the measured image, acquiring a second pattern image showing a pattern of the semiconductor device, acquiring matching information indicating a correlation of the first pattern image and the second pattern image based on the first pattern image and the second pattern image, and superimposing the second pattern image and the measured image based on the matching information to acquire a superimposed image.

Alternatively, a system according to another aspect of the present invention is a system for superimposing a measured image measured from a semiconductor device and a pattern image showing a pattern of the semiconductor device, and includes a storage configured to store a measured image, a first pattern image data showing a first pattern image of the semiconductor device corresponding to the measured image, and a second pattern image data showing a second pattern image of the semiconductor device, an image analyzer configured to acquire matching information indicating a correlation of the first pattern image and the second pattern image based on the first pattern image data and the second pattern image data, and an image processor configured to superimpose the second pattern image and the measured image based on the matching information to acquire a superimposed image.

Alternatively, a storage medium according to another aspect of the present invention is a storage medium storing an image processing program for superimposing a measured image measured from a semiconductor device and a pattern image showing a pattern of the semiconductor device, and causes a computer to function as an image analyzer configured to, based on a first pattern image showing a pattern of the semiconductor device corresponding to the measured image and a second pattern image showing a pattern of the semiconductor device, acquire matching information indicating a correlation of the first pattern image and the second pattern image, and an image processor configured to superimpose the second pattern image and the measured image based on the matching information to acquire a superimposed image.

According to such an image processing method, image processing apparatus, or image processing program or a storage medium storing the image processing program, the positional relationship of the second pattern image and the measured image can be accurately obtained based on the matching information between the first pattern image corresponding to the measured image of the semiconductor device and the second pattern image of the semiconductor device, and by acquiring a superimposed image of the second pattern image and the measured image based on that positional relationship, an accurate superimposed image can be obtained.

Advantageous Effects of Invention

The present invention enables accurately generating a superimposed image of a measured image such as a photo emission or thermal emission of a semiconductor device and its pattern image.

DESCRIPTION OF THE PREFERRED EMBODIMENTS

Figure 1:
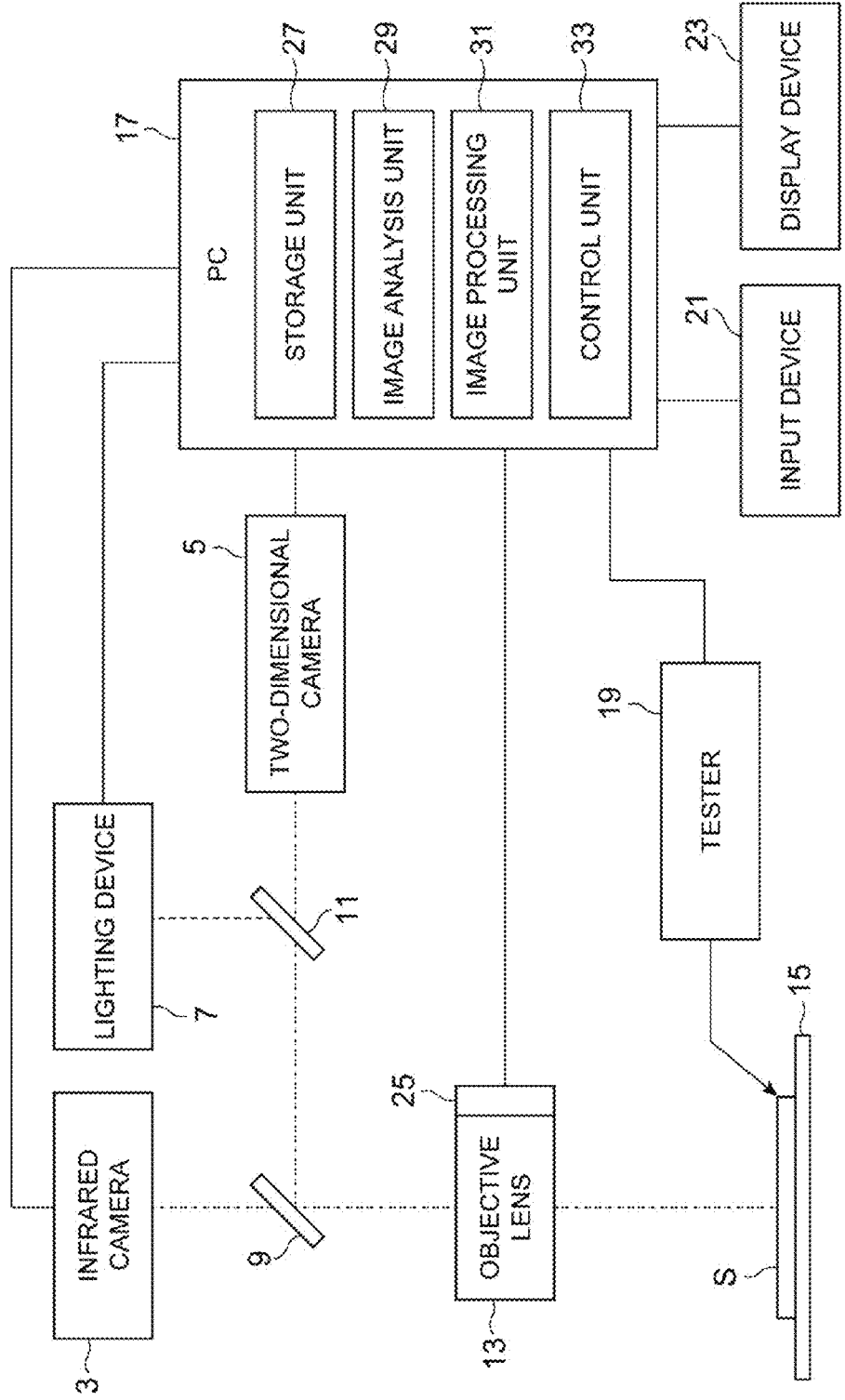
FIG. 1 is a schematic configuration diagram of an observation system 1A which is an image processing apparatus according to a first embodiment of the present invention.

Hereinafter, preferred embodiments of an image processing method, image processing apparatus, and image processing program according to the present invention will be described together with the drawings. Also, the same components are denoted with the same reference numerals in description of the drawings, and overlapping description will be omitted.

First Embodiment

FIG. 1 is a schematic configuration diagram of an observation system 1A which is an image processing apparatus according to a first embodiment of the present invention. The observation system 1A shown in FIG. 1 is an optical system that acquires (captures) and processes an image to observe a thermal image of an IC (Integrated Circuit) such as a semiconductor memory or an LSI or a semiconductor device such as a power device. The observation system 1A is configured including an infrared camera 3, a two-dimensional camera 5, a lighting device 7, a dichroic mirror 9, a beam splitter 11 such as a half-mirror, an objective lens 13, a stage 15, a computer (Personal Computer) 17, a tester 19, an input device 21, and a display device 23.

The infrared camera 3 is an imaging device such as an InSb (indium antimonide) camera having sensitivity at infrared wavelengths, and acquires (captures) a measured image by capturing a thermal image of a semiconductor device S placed on the stage 15. The infrared camera 3 detects a thermal image of the semiconductor device S placed on the stage 15 via the objective lens 13 and the dichroic mirror 9.

The two-dimensional camera 5 is a camera having a built-in CCD (Charge-Coupled Device) image sensor, CMOS (Complementary Metal-Oxide Semiconductor) image sensor, or the like, and captures a two-dimensional image such as a pattern image showing a pattern of a semiconductor device S placed on the stage 15. The two-dimensional camera 5 detects a two-dimensional image of the semiconductor device via the objective lens 13, the dichroic mirror 9, and the beam splitter 11.

The objective lens 13 is provided opposite to the semiconductor device S, and sets the magnification of images to be formed on the infrared camera 3 or the two-dimensional camera 5. The objective lens 13 includes an objective lens switching means 25 and a plurality of lenses of different powers, and has a function of switching the objective lens 13 to form an image on the infrared camera 3 or the two-dimensional camera 5 between a high-power lens and a low-power lens.

The dichroic mirror 9 transmits light of an infrared wavelength in order to guide a thermal image of the semiconductor device S to the infrared camera 3, and reflects light of a wavelength other than infrared wavelengths in order to guide a pattern image of the semiconductor device S to the two-dimensional camera 5. The beam splitter 11 transmits the pattern image reflected by the dichroic mirror 9 toward the two-dimensional camera 5, and reflects illumination light for pattern image generation emitted from the lighting device 7 toward the dichroic mirror 9 to thereby irradiate the semiconductor device S with the illumination light by way of the dichroic mirror 9 and the objective lens 13.

The tester 19 applies a test pattern of a predetermined electric signal, a predetermined voltage, or a predetermined current to the semiconductor device S. By the application of a test pattern, a thermal image due to a failure of the semiconductor device S is produced.

The computer 17 is an image processing device that processes images acquired by the infrared camera 3 or the two-dimensional camera 5. In greater detail, the computer 17 consists of, as functional components, a storage unit 27, an image analysis unit (an image analyzer) 29, an image processing unit (image processor) 31, and a control unit 33. Also, the computer 17 is attached with an input device 21 such as a mouse and/or keyboard to input data to the computer 17, and a display device 23 such as a display unit to display a result of image processing by the computer 17.

The respective functional units of the computer 17 shown in FIG. 1 are of functions that are realized by an arithmetic processing unit such as a CPU of the computer 17 executing a computer program (image processing program) stored in a storage medium such as a built-in memory or hard disk drive of the computer 17. The arithmetic processing unit of the computer 17 causes the computer 17 to function as the respective functional units of FIG. 1 by executing the image processing program to sequentially execute processing corresponding to an image processing method to be described later. Various types of data necessary for execution of the computer program and various types of data generated by execution of the computer program are all stored in a storage medium such as a built-in memory including a ROM, RAM, etc., and/or hard disk drive of the computer 17.

Here, the functions of the respective functional units of the computer 17 will be described. The storage unit 27 sequentially stores a measured image with a thermal image detected acquired by the infrared camera 3, a first pattern image with a pattern image of a semiconductor device S detected acquired by the infrared camera 3, and a second pattern image with a pattern image of the semiconductor device detected acquired by the two-dimensional camera 5. The image analysis unit 29 and the image processing unit 31 execute various types of image data processing for the images stored in the storage unit 27. In detail, the image analysis unit 29 acquires matching information indicating a correlation in terms of the position, size, and angle of the first pattern image and the second pattern image stored in the storage unit 27. Also, the image processing unit 31 refers to the matching information acquired by the image analysis unit 29, while acquiring a superimposed image by a superimposing processing of the second pattern image and the thermal image in the measured image. The control unit 33 controls data processing in the computer 17 and processing of the devices connected to the computer 17. For example, the control unit 33 controls emission of illumination light by the lighting device 7, imaging by the infrared camera 3 and the two-dimensional camera 5, switching of the power of the objective lens 13, application of a test pattern by the tester 19, and display of an observation result (a superimposed image etc.) by the display device 23.

In the following, description will be given of a procedure for generating a superimposed image by the observation system 1A, while an image processing method according to the present embodiment will be described in detail.

Figure 2:
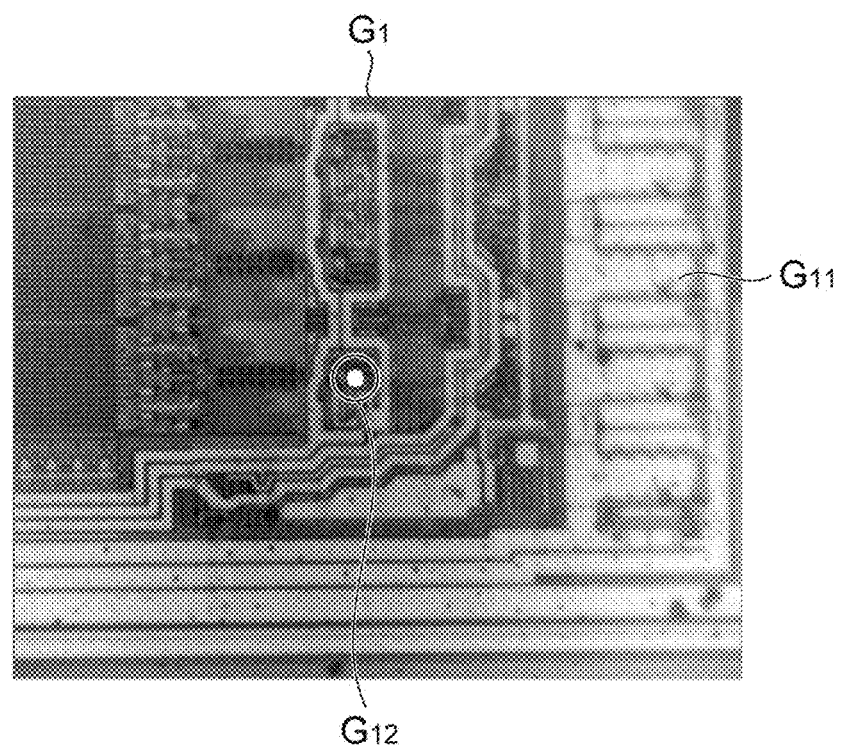
FIG. 2 is a view showing an example of an image of a measured image stored in the storage unit 27 of FIG. 1.

First, when an instruction to start an observation processing of a semiconductor device is received, using the input device 21, from an operator of the observation system 1A by the computer 17, through control by the control unit 33, the objective lens 13 is switched to a preset power (for example, a low power), and then application of a test pattern by the tester 19 is started. In this state, through control by the control unit 33, a measured image including a thermal image of the semiconductor device is acquired by the infrared camera 3 and stored in the storage unit 27 (step A1-1: thermal image acquisition step). The measured image is generated by addition of image data of a plurality of images successively captured in a predetermined exposure time. FIG. 2 shows an example of the image of a measured image stored in the storage unit 27. In the measured image $G_1$, a pattern image $G_{11}$ resulting from heat from the semiconductor device S as a whole being imaged and a thermal image $G_{12}$ that is produced from a point under observation such as a failure point of the semiconductor device S with application of a test pattern are included. Because the heat from the semiconductor device as a whole carries information on the shape of an element that forms the semiconductor device, the pattern image $G_{11}$ results in an image representing a pattern of the semiconductor device S.

Figure 3:
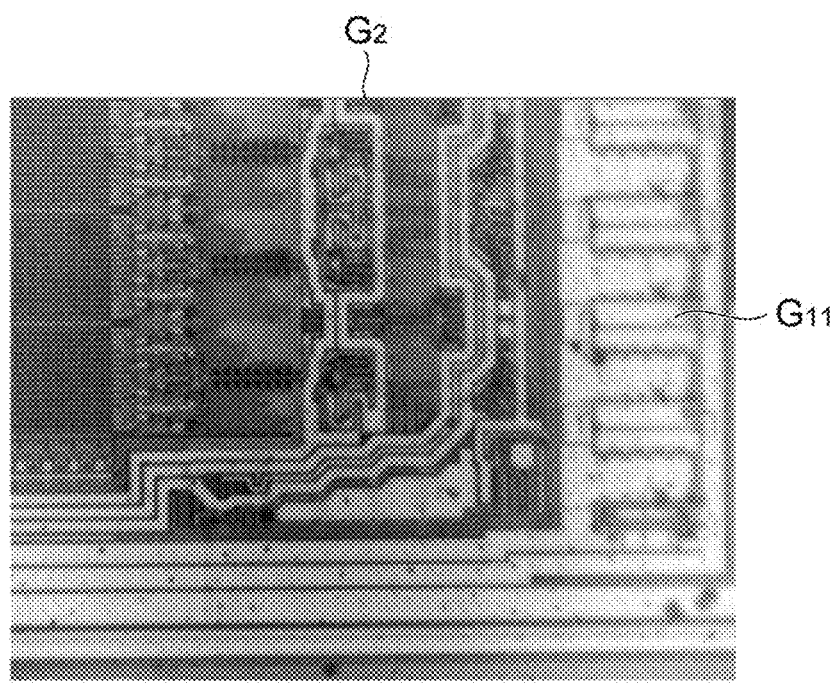
FIG. 3 is a view showing an example of an image of a first pattern image stored in the storage unit 27 of FIG. 1.

Next, through control by the control unit 33, the application of a test pattern by the tester 19 is stopped while the power of the objective lens 13 is maintained. In this state, through control by the control unit 33, a first pattern image including only a pattern image of the semiconductor device is acquired by the infrared camera 3 and stored in the storage unit 27 (step A1-2: pattern image acquisition step). Similar to step A1-1, the first pattern image is generated by addition of image data of a plurality of images successively captured in a predetermined exposure time. FIG. 3 shows an example of the image of a first pattern image stored in the storage unit 27. In the first pattern image $G_2$, only a pattern image $G_{11}$ resulting from heat from the semiconductor device S as a whole being imaged is included, and the pattern image $G_{11}$ results in an image representing a pattern of the semiconductor device S. That is, the first pattern image $G_2$ represents a pattern image that is coincident with (corresponds to) a pattern image included in the measured image $G_1$.

Figure 4:
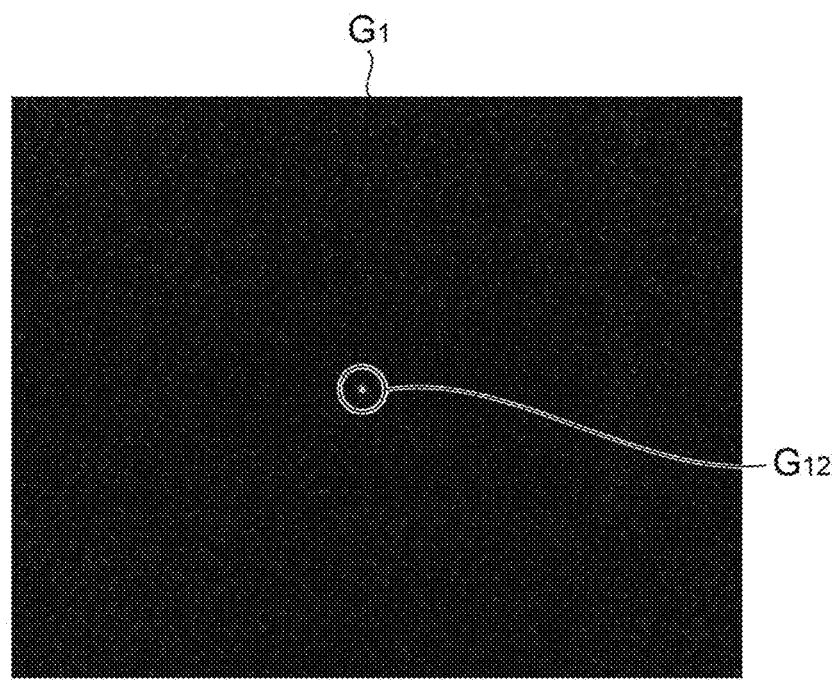
FIG. 4 is a view showing an example of an image of a measured image generated by the image analysis unit 29 of FIG. 1.

Then, the image analysis unit 29 of the computer 17 reads out the measured image $G_1$ and the first pattern image $G_2$ from the storage unit 27 and performs a subtraction processing of the first pattern image $G_2$ from the measured image $G_1$ to thereby process and generate a measured image $G_1$ including only a thermal image (step A1-3: thermal image subtraction step). FIG. 4 shows an example of the image of the measured image $G_1$ generated by the image analysis unit 29. As shown therein, only the thermal image $G_{12}$ appears as a result of the pattern image being excluded from the measured image $G_1$.

Figure 5:
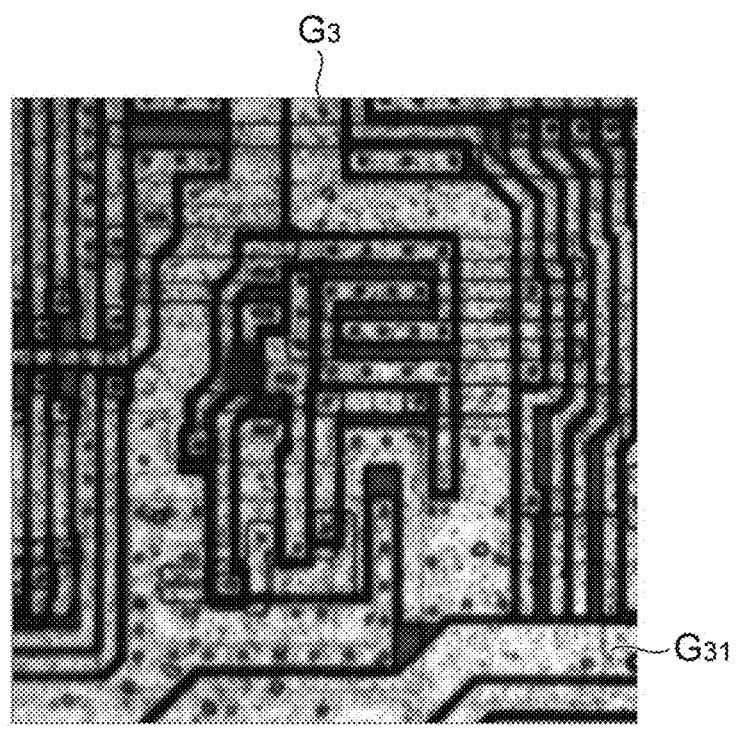
FIG. 5 is a view showing an example of an image of a second pattern image stored in the storage unit 27 of FIG. 1.

Further, through control by the control unit 33, the objective lens 13 is switched to another preset power (for example, a high power), and then emission of illumination light from the lighting device 7 is started. In this state, through control by the control unit 33, a second pattern image including a pattern image of the semiconductor device is acquired by the two-dimensional camera 5 and stored in the storage unit 27 (step A2: pattern image acquisition step). FIG. 5 shows an example of the image of a second pattern image stored in the storage unit 27. In the second pattern image $G_3$, a pattern image $G_{31}$ resulting from reflected light from the semiconductor device S as a whole being imaged is included. Because the reflection image from the semiconductor device as a whole shows the shape of a surface that forms the semiconductor device, the pattern image $G_{31}$ results in an image representing a surface pattern of the semiconductor device S.

Then, matching information is acquired by the image analysis unit 29 based on the first pattern image $G_2$ and the second pattern image $G_3$ stored in the storage unit 27 (step A3: matching information acquisition step).

In this, step A3, first, the image size of at least either one of the first pattern image $G_2$ or the second pattern image $G_3$ is adjusted based on a ratio of a size of visual field being the size of a range on the semiconductor device S of the first pattern image $G_2$ to a size of visual field being the size of a range on the semiconductor device S of the second pattern image $G_3$ (step A3-1: pattern image adjustment step). More specifically, the image analysis unit 29 acquires the power of the objective lens 13 when the first pattern image $G_2$ was acquired and the power of the objective lens 13 when the second pattern image $G_3$ was acquired, and provides their respective reciprocals as numerical values indicating the sizes of visual fields of the first pattern image $G_2$ and the second pattern image $G_3$. Moreover, the image analysis unit 29 adjusts the size of the second pattern image $G_3$ so as to match an image size on the first pattern image $G_2$ based on the numerical values. For example, where the power when the first pattern image $G_2$ was acquired is 15× and the power when the second pattern image $G_3$ was acquired is 100×, their respective sizes of visual fields are provided as $1/15$ and $1/100$, and the image size of the second pattern image $G_3$ is adjusted to be $15/100$ times. Here, when adjusting the first pattern image $G_2$ and the second pattern image $G_3$ in image size, the image analysis unit 29 may adjust the image size of the first pattern image $G_2$ or may adjust both to different image sizes of an identical magnification.

Figure 6:
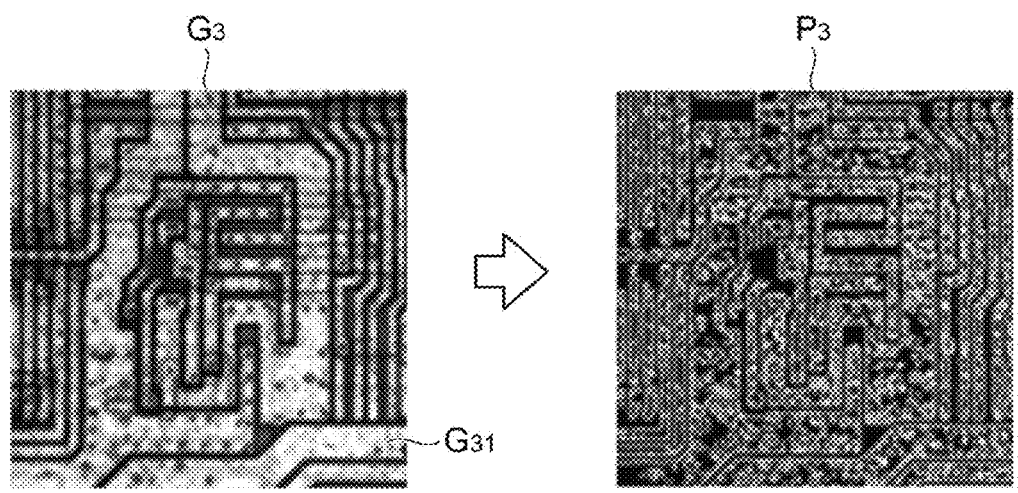
FIG. 6 is a view showing an example of second shape information extracted from the second pattern image by the image analysis unit 29 of FIG. 1.

Next, the image analysis unit 29 performs shape-based matching for the first pattern image $G_2$ and the second pattern image $G_3$ that has been adjusted in image size (step A3-2: shape-based matching step). By performing a matching processing by the shape-based matching, matching can be accurately performed even for the pattern images $G_2$ and $G_3$ different in contrast acquired by different cameras. In detail, the image analysis unit 29 extracts, from the first pattern image $G_2$ and the second pattern image $G_3$, their respective contours (edge lines) as first and second shape information. Moreover, the image analysis unit 29 searches the first shape information and the second shape information for similar patterns that are similar to each other therebetween. FIG. 6 shows an example of the second shape information extracted from the second pattern image $G_3$ by the image analysis unit 29. As shown therein, the contours of the pattern image $G_{31}$ included in the second pattern image $G_3$ are extracted as second shape information $P_3$. Here, when performing shape-based matching, the image analysis unit 29 performs matching by pyramid levels by changing the resolution of both or one of the first pattern image $G_2$ and the second pattern image $G_3$ at multiple levels. That is, when acquiring low-resolution images of both or one of the first pattern image $G_2$ and the second pattern image $G_3$ at a plurality of resolutions and matching the first pattern image $G_2$ and the second pattern image $G_3$, a shape matching processing with the other image is proceeded in sequence from high-level images of low resolution to low-level images of high resolution. A high-speed matching processing is thereby realized. In addition, the image analysis unit 29 may set the number of pyramid levels according to the contrast of the first pattern image $G_2$ and the second pattern image $G_3$ and the resolution of the original image.

Figure 7:
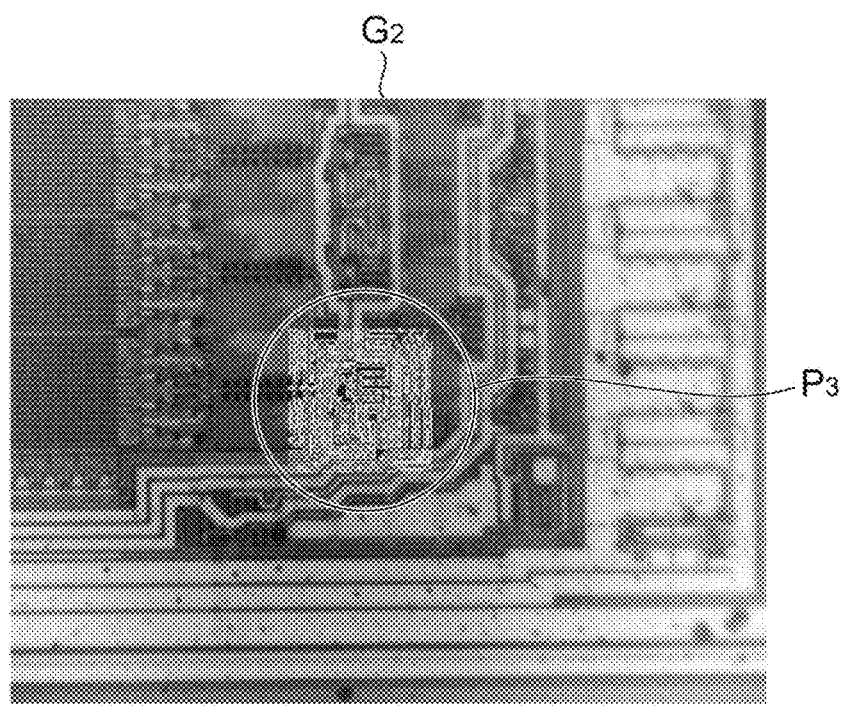
FIG. 7 is a view showing an example of the first pattern image and the second shape information of the second pattern image to be subjected to a matching processing by the image analysis unit 29 of FIG. 1.

Then, the image analysis unit 29 acquires matching information indicating a correlation of the first pattern image $G_2$ and the second pattern image $G_3$ from a result of the shape-based matching (step A3-3: information acquisition step). Such matching information includes positional information indicating the position of the first pattern image $G_2$ with respect to the second pattern image $G_3$, angle information indicating the rotation angle on an image plane of the first pattern image $G_2$ with respect to the second pattern image $G_3$, and the magnification of the first pattern image $G_2$ with respect to the second pattern image $G_3$. FIG. 7 shows an example of the first pattern image $G_2$ and the second shape information $P_3$ of the second pattern image $G_3$ to be subjected to a matching processing by the image analysis unit 29. As shown in the same figure, matching information is acquired from the matching result of the first pattern image $G_2$ with respect to the second shape information $P_3$.

Figure 8:
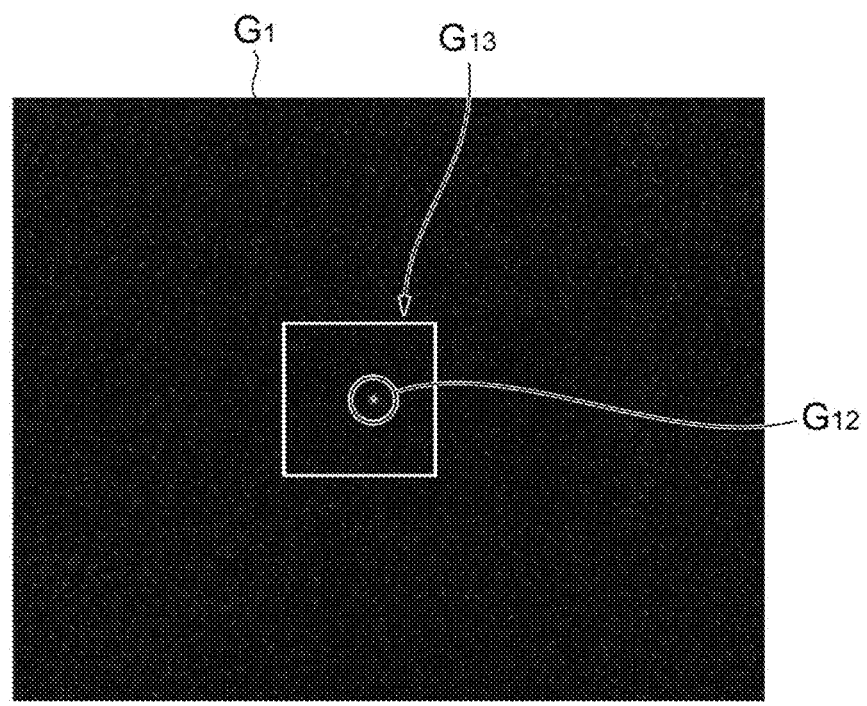
FIG. 8 is a view showing an example of an extracted image including a thermal image, extracted from the measured image by the image processing unit 31 of FIG. 1.
Figure 9:
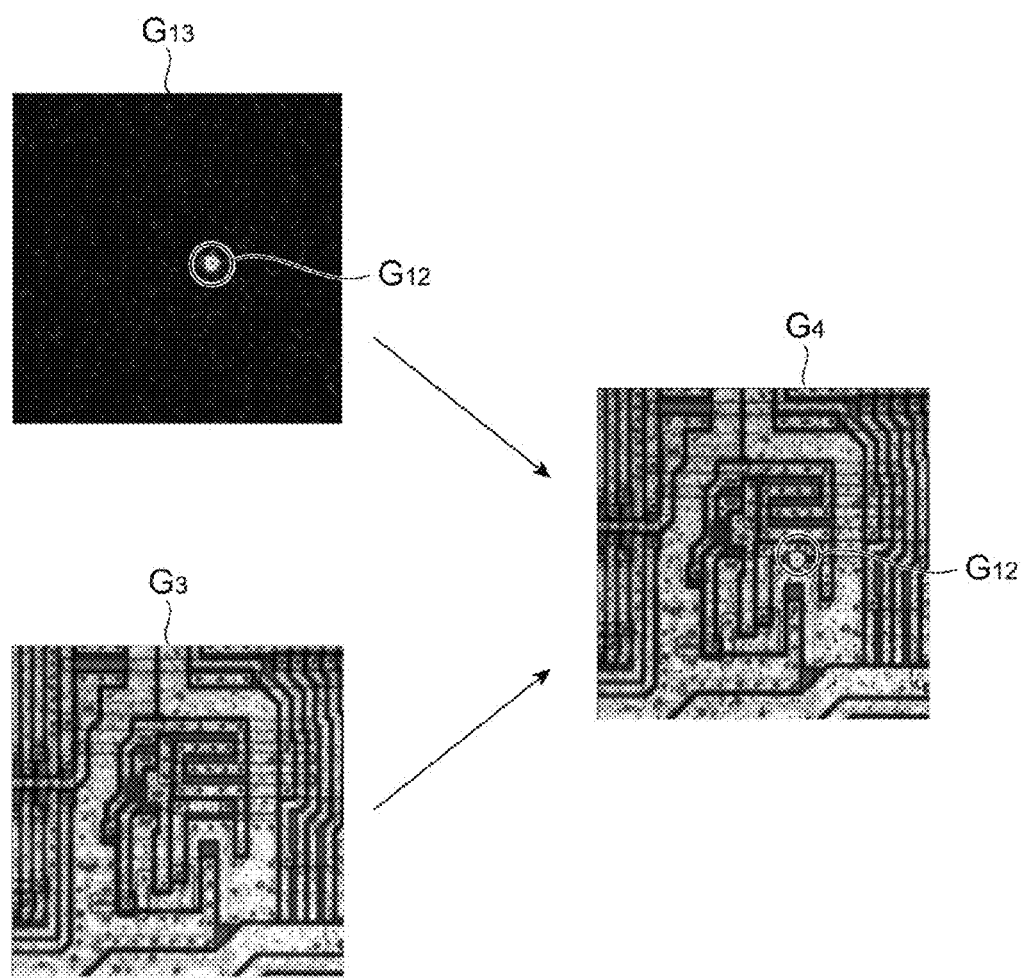
FIG. 9 is a view showing an example of a superimposed image superimposed based on the extracted image and the second pattern image by the image processing unit 31 of FIG. 1.

After the processing of step A3, a superimposed image is acquired as a result of the second pattern image $G_3$ and the measured image $G_1$ being superimposed, by the image processing unit 31, based on the matching information acquired by the image analysis unit 29, and the superimposed image is displayed on the display device 23 (step A4: superimposed image acquisition step). In detail, the image processing unit 31, based on the matching information, identifies a range corresponding to the second pattern image $G_3$ in the image of the first pattern image $G_2$, and extracts an extracted image $G_{13}$ corresponding to the range from the measured image $G_1$. FIG. 8 shows an example of the extracted image $G_{13}$ including a thermal image $G_{12}$, which is extracted from the measured image $G_1$ by the image processing unit 31. Moreover, a superimposed image $G_4$ for which the extracted image $G_{13}$ and the second pattern image $G_3$ are superimposed is generated by the image processing unit 31. At this time, the extracted image $G_{13}$ extracted from a measured image $G_1$ is, by the image processing unit 31, applied with an interpolation processing of pixels so as to coincide in resolution with the second pattern image $G_3$. FIG. 9 shows an example of the superimposed image $G_4$ superimposed based on the extracted image $G_{13}$ and the second pattern image $G_3$ by the image processing unit 31.

According to the observation system 1A and the image processing method using the same described above, the positional relationship of the second pattern image $G_3$ and the measured image $G_1$ can be accurately obtained based on the matching information between the first pattern image $G_2$ corresponding to the measured image $G_1$ of the semiconductor device S and the second pattern image $G_3$ of the semiconductor device S, and by acquiring a superimposed image $G_4$ of the second pattern image $G_3$ and the measured image $G_1$ based on that positional relationship, an accurate superimposed image can be obtained. As a result, the position of a point under observation such as a failure point on the semiconductor device S can be easily identified.

Also, shape information is extracted respectively from the first and second pattern images $G_2$ and $G_3$ and matching information is acquired based on the shape information. Matching information can be thereby easily obtained even when the first and second pattern images $G_2$ and $G_3$ are different in contrast.

Also, the image size of at least either one of the first and second pattern images $G_2$ and $G_3$ is adjusted based on the ratio in size of visual field between the first and second pattern images $G_2$ and $G_3$. In this case, even if the measured image $G_1$ and the second pattern image $G_3$ are different in size of visual field, a superimposed image $G_4$ in which these images are coincident with one another in position on the semiconductor device S can be prepared.

Further, the positional information, rotational information, and magnification information indicating a correlation of the first and second pattern images $G_2$ and $G_3$ are used as matching information. The positional relationship of the measured image $G_1$ and the second pattern image $G_3$ can thereby be simply obtained, and based thereon, a superimposed image $G_4$ can be simply acquired.

First Modification of First Embodiment

Figure 10:
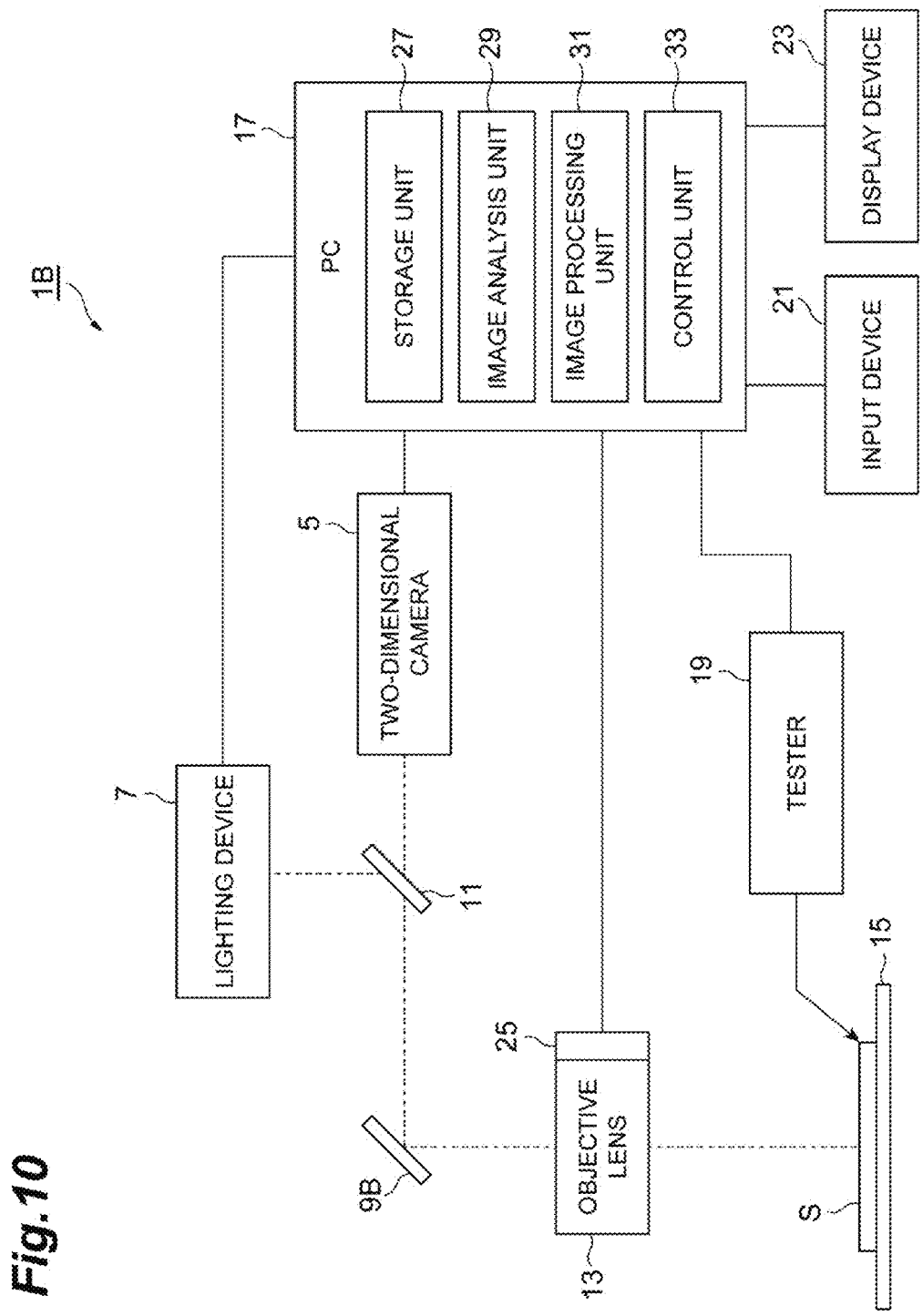
FIG. 10 is a schematic configuration diagram of an observation system 1B according to a first modification of the first embodiment of the present invention.

Next, description will be given, regarding a first modification of the first embodiment of the present invention, of only the difference from the first embodiment. FIG. 10 is a schematic configuration diagram of an observation system 1B according to the first modification of the first embodiment of the present invention.

In the observation system 1B, a measured image $G_1$ is acquired as a photo emission image of the semiconductor device S. In detail, as compared with the observation system 1A, in the observation system 1B, the infrared camera 3 is removed, and a mirror 9B is provided in place of the dichroic mirror 9. Moreover, a test pattern is applied by the tester 19 in a state where emission of illumination light by the lighting device 7 has not been performed, and a photo emission image of the semiconductor device S is acquired as a measured image $G_1$ by the two-dimensional camera 5 in a state where the sensitivity of the two-dimensional camera 5 has been set to a high gain. Then, a reflection image of the semiconductor device S is acquired as a first pattern image $G_2$ by the two-dimensional camera 5 in a state where emission of illumination light by the lighting device 7 has been performed, the application of a test pattern by the tester 19 is stopped, and the sensitivity of the two-dimensional camera 5 has been set to a low gain. In this case, a pattern image of the semiconductor device S does not appear in the measured image $G_1$, a subtraction processing of the first pattern image $G_2$ from the measured image $G_1$ is not always required. Also, the test pattern may be kept applied at the time of acquisition of the first pattern image $G_2$. Also, the beam splitter 11 may be removed at the time of acquisition of the measured image $G_1$ to directly capture a photo emission reflected by the mirror 9B by the two-dimensional camera 5, the beam splitter 11 may be attached at the time of acquisition of the pattern image $G_2$ to transmit through the beam splitter 11 and capture a reflection image reflected by the mirror 9B by the two-dimensional camera 5. In this case, a mirror may be used in place of the beam splitter 11. The two-dimensional camera 5 may be an InGaAs camera or an MCT (Mercury Cadmium Tellu) camera, besides the camera having a built-in CCD image sensor or CMOS image sensor having sensitivity at near-infrared wavelengths.

Second Modification of First Embodiment

Figure 11:
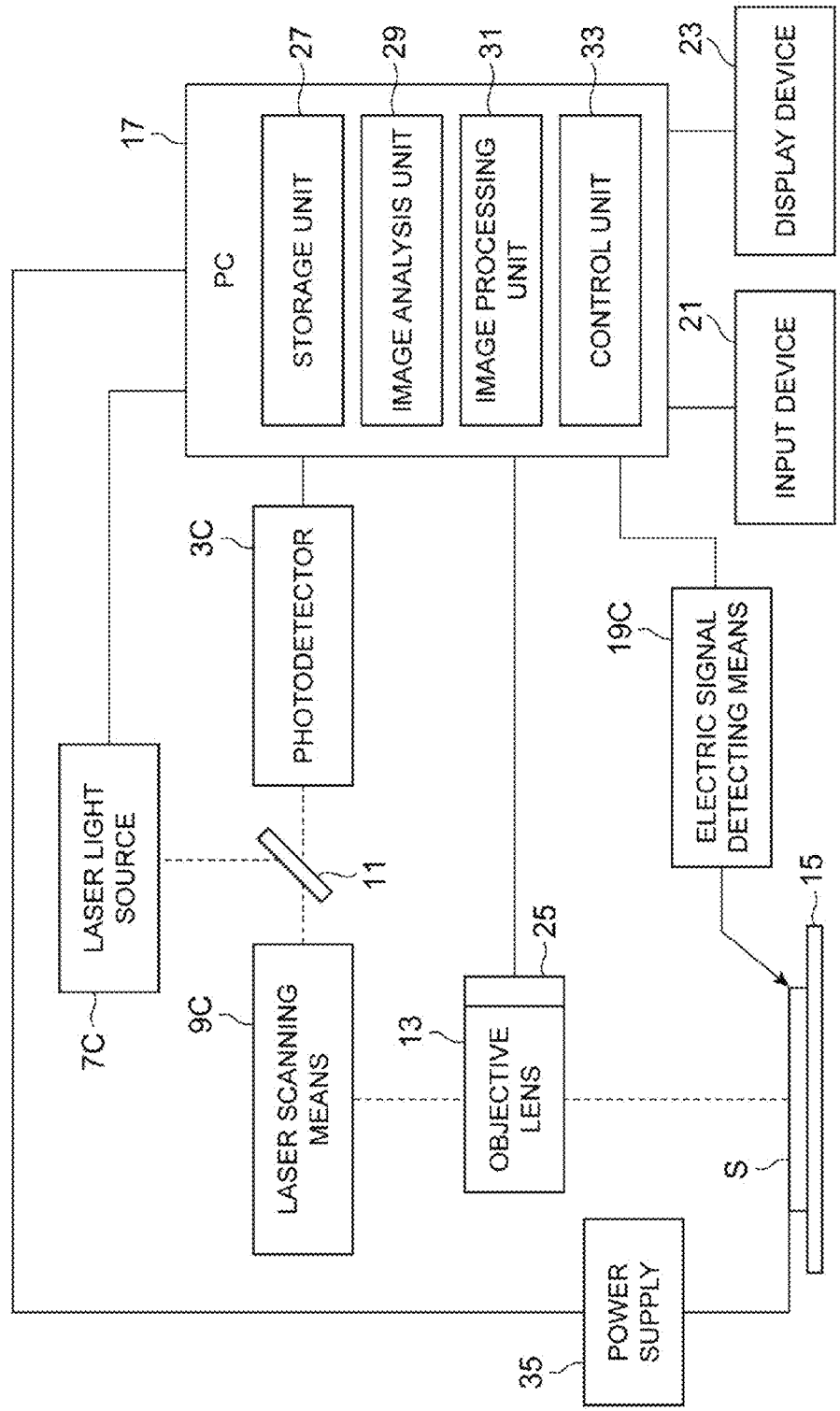
FIG. 11 is a schematic configuration diagram of an observation system 1C according to a second modification of the first embodiment of the present invention.

Next, description will be given, regarding a second modification of the first embodiment of the present invention, of only the difference from the first embodiment. FIG. 11 is a schematic configuration diagram of an observation system 1C according to a second modification of the first embodiment of the present invention. In addition, in the same figure, only constituents concerning acquisition of a measured image and a first pattern image are shown, and constituents concerning acquisition of a second pattern image are the same as those of the first embodiment and illustration thereof is therefore omitted.

In the observation system 1C, a measured image $G_1$ is acquired as an electric signal image of the semiconductor device S. In detail, as compared with the observation system 1A, in the observation system 1C, the infrared camera 3 is removed, a laser light source 7C for irradiating laser light is provided in place of the lighting device 7, a photodetector 3C such as a photodiode or avalanche photodiode for detecting laser light reflected on the semiconductor device S is provided in place of the two-dimensional camera 5, and a laser scanning means 9C for scanning the semiconductor device S with laser light two-dimensionally is provided in place of the dichroic mirror 9. Further, in the observation system 1C, a power supply 35 for applying an electric signal of a constant voltage or a constant current to the semiconductor device S and an electric signal detecting means 19C electrically connected to the semiconductor device S are provided.

In such an observation system 1C, laser light emitted from the laser light source 7C is two-dimensionally scanned onto the semiconductor device S by the laser scanning means 9C, while an electric signal generated in the semiconductor device S is detected by the electric signal detecting means 19C. Moreover, in the storage unit 27 of the computer 17, an electric signal image for which the scanning positions on the semiconductor device S of laser light and characteristic values of the detected electric signal are made into an image in relation to each other is stored as a measured image $G_1$. Examples of such an electric signal image that can be mentioned include an OBIC (Optical Beam Induced Current) image being an photoinduced current image, an OBIRCH (Optical Beam Induced Resistance Change) image being an electrical quantity change image, and an SDL (Soft Defect Localization) image being a pass/fail information image.

The OBIC image is one acquired by detecting an photoinduced current generated by laser light as a characteristic value (current value or value of current change) of an electric signal, and making the characteristic values into an image in coordination with laser irradiating position information. On the other hand, the OBIRCH image is one for which characteristic values (voltage values or values of voltage change) of an electric signal according to changes in resistance value of the position of irradiation with laser light of the semiconductor device S are made into an image by scanning laser light with a constant current applied to the semiconductor device S. That is, the OBIRCH image is one for which values of voltage change and laser irradiating position information are coordinated with each other into an image. In addition, the OBIRCH image may be one for which values of current change of an electric signal according to changes in resistance value of the position of irradiation with laser light of the semiconductor device S are made into an image by scanning laser light with a constant voltage applied to the semiconductor device S. Still, on the other hand, the SDL image is also called a DALS (Dynamic Analysis by Laser Stimulation) image or a LADA (Laser Assisted Device Alteration) image, and is one that is acquired, by scanning laser light with a test pattern applied to the semiconductor device S to detect a malfunctioning state, as an image of pass/fail information of malfunction information that is multi-valued with respect to the laser irradiating position on a semiconductor device.

As above, in the observation system 1C that acquires (captures) a measured image $G_1$ as an electric signal image, by detecting reflected light of laser light by the photodetector 3C simultaneously with performing two-dimensional scanning with laser light on the semiconductor device S while an electrical signal image is acquired, a first pattern image $G_2$ is acquired. In detail, laser light is scanned onto the semiconductor device S, while the intensity of reflected light of the semiconductor device S is detected, and in the storage unit 27 of the computer 17, a first pattern image $G_2$ for which the reflected light intensity is related to the laser irradiating position information into an image is stored.

Third Modification of First Embodiment

Figure 12:
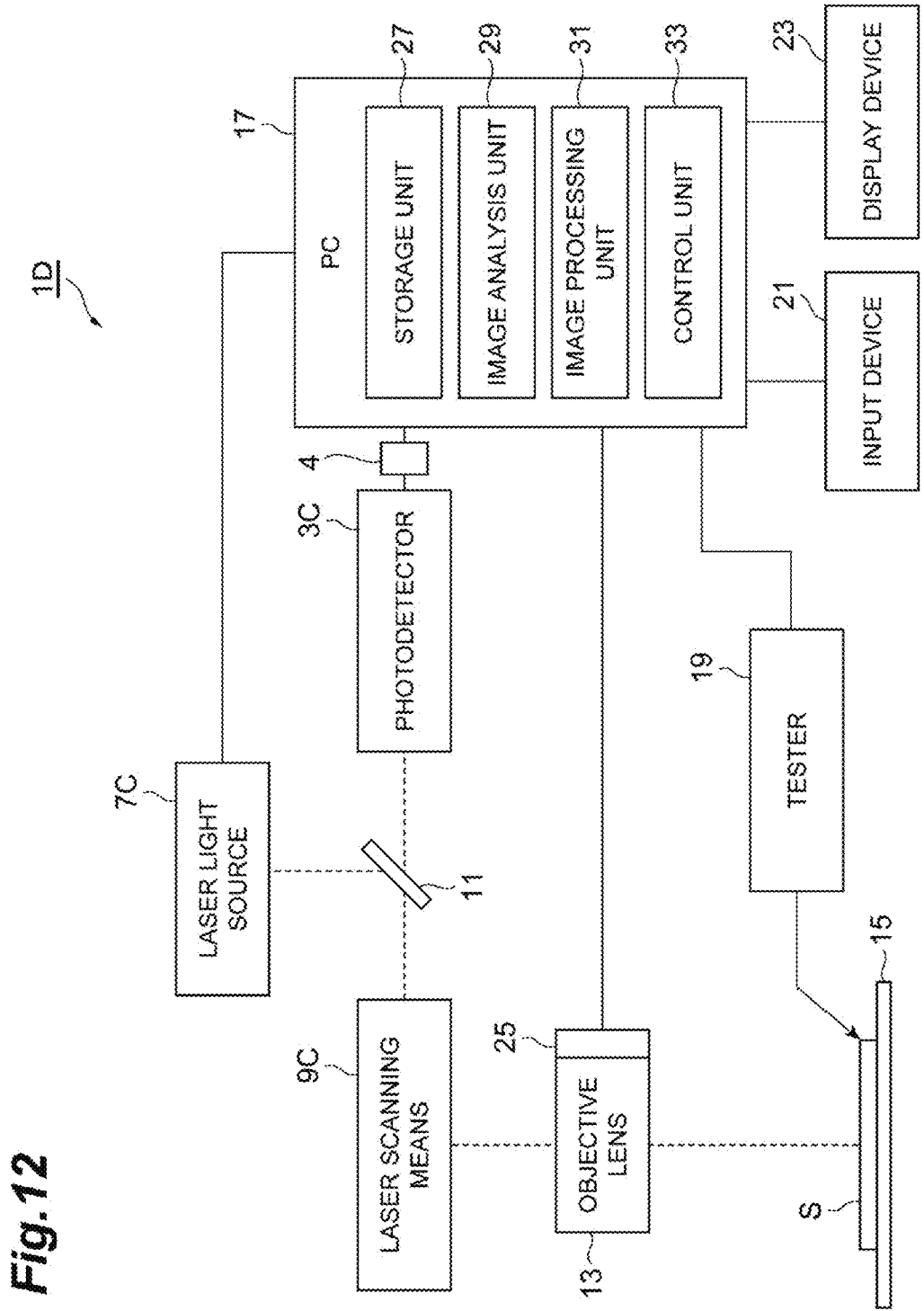
FIG. 12 is a schematic configuration diagram of an observation system 1D according to a third modification of the first embodiment of the present invention.

Next, description will be given, regarding a third modification of the first embodiment of the present invention, of only the difference from the first embodiment. FIG. 12 is a schematic configuration diagram of an observation system 1D according to a third modification of the first embodiment of the present invention. In addition, in the same figure, only constituents concerning acquisition of a measured image and a first pattern image are shown, and constituents concerning acquisition of a second pattern image are the same as those of the first embodiment and illustration thereof is therefore omitted.

In the observation system 1D, a measured image $G_1$ is acquired as an electro-optical frequency mapping image of the semiconductor device S. In detail, as compared with the observation system 1A, in the observation system 1D, the infrared camera 3 is removed, a laser light source 7C for irradiating laser light is provided in place of the lighting device 7, a photodetector 3C such as a photodiode or avalanche photodiode for detecting laser light reflected on the semiconductor device S is provided in place of the two-dimensional camera 5, and a laser scanning means 9C for scanning the semiconductor device S with laser light two-dimensionally is provided in place of the dichroic mirror 9.

In such an observation system 1D, a test pattern is repeatedly applied to the semiconductor device S by the tester 19, and laser light emitted from the laser light 7C is two-dimensionally scanned onto the semiconductor device S by the laser scanning means 9C, while reflected light generated in the semiconductor device S is detected by the photodetector 3C. Moreover, an AC component of a detection signal of the photodetector 3C is extracted, and then input to a frequency analysis device 4 such as a spectrum analyzer or a lock-in detector. The frequency analysis device 4 performs a frequency analysis at a specific frequency for the detection signal, and outputs analysis data to the computer 17. In the computer 17, the scanning positions on the semiconductor device S of laser light and the analysis data are related to each other, and an electro-optical frequency mapping image (EOFM (Electro Optical Frequency Mapping) image) for which the signal intensity of parts operating at the specific frequency is made into an image is stored as a measured image $G_1$ in the storage unit 27. In addition, an amplitude image, a phase image, an I/Q image, or the like can be the electro-optical frequency mapping image. In the case of an amplitude image, the analysis data is the amplitude of a detection signal at a specific frequency, and in the case of a phase image, the analysis data is the phase (a phase difference) of a signal of a specific frequency and a detection signal. On the other hand, in the case of an I/Q (In-phase/Quadrature) image, the analysis data is an I/Q value (In-phase/Quadrature value) indicating a change in amplitude and phase. Further, a DC component of the detection signal of the photodetector 3C is extracted, and in the storage unit 27, a first pattern image $G_2$ for which the scanning positions on the semiconductor device S of laser light and the DC component of the detection signal are made into an image in relation to each other is stored. According to such an observation system 1D, a modulated light of reflected light produced with an operation of an element such as a transistor at the time of irradiation of the semiconductor device S with laser light is observed as two-dimensional image information.

In addition, the present invention is not limited to the embodiment mentioned above. For example, as the second pattern image $G_3$, an photoinduced current image using multiphoton absorption (MOBIC image) may be used, for which multiphoton absorption such as two-photon absorption is caused by irradiating the semiconductor device S with a short pulse laser such as a femtosecond laser having a wavelength of 1200 nm, or more. Alternatively, as the second pattern image $G_3$, CAD layout data of the semiconductor device S may be used, and a measured image may be superimposed on the CAD layout data. Still alternatively, the second pattern image $G_3$ may be a transmission image for which a transmission image of X-rays or the like is captured.

As the laser light source 7C to be used in the observation system 1C, 1D, besides a laser light source, a light source that outputs light of high coherence (coherent light) such as an LED (Light-Emitting Diode) light source may be adopted, or a light source that outputs light of low coherence (incoherent light) such as an SLD (Super Luminescent Diode) light source, an ASE (Amplified Spontaneous Emission) light source, or a lamp light source may be adopted. Alternatively, the laser light source 7C may be a light source that outputs light of a wavelength that causes multiphoton absorption (a wavelength of, for example, 1200 nm or more) and with a short pulse width (for example, a pulse width of subpicoseconds or femtoseconds).

In addition, the device for acquiring a measured image $G_1$ of a semiconductor device S and a first pattern image $G_2$ of the semiconductor device corresponding to the measured image $G_1$ and the device for acquiring a second pattern image $G_3$ of the semiconductor device S may be united or may be separate devices, and the acquisition of a measured image $G_1$ and a first pattern image $G_2$ and the acquisition of a second pattern image $G_3$ may not be performed in the flow of a series of processing. The present embodiment, if a measured image $G_1$, a first pattern image $G_2$ with a pattern image of the semiconductor device S detected, and a second pattern image $G_3$ with a pattern image of the semiconductor device S detected are stored in the storage unit 27 of the computer 17, executes various types of image data processing for the images stored in the storage unit 27 by the image analysis unit 29 and the image processing unit 31, and is thus not subject to restrictions including devices, measurement environment, and the flow of measurement.

Also, in the present embodiment, a second measured image and a third pattern image corresponding to the second measured image may be further acquired, and the measured image $G_1$ and the second measured image may be superimposed on the second pattern image $G_3$ on the basis of matching information based on the second pattern image $G_3$ and the third pattern image. As above, superimposing a plurality of measured images on the second pattern image $G_3$ facilitates performing analysis of the semiconductor device S based on a plurality of measured images.

Here, in the image processing method, image processing apparatus, or image processing program described above, the step of acquiring matching information may be of extracting first shape information from the first pattern image, extracting second shape information from the second pattern image, and acquiring matching information based on the first shape information and the second shape information. This allows easily obtaining matching information even when the first pattern image and the second pattern image are different in contrast.

Also, the step of acquiring matching information may be of adjusting the image size of at least either one of the first pattern image and the second pattern image based on the ratio of a first size of visual field indicating a range on the semiconductor device of the first pattern image to a second size of visual field indicating a range on the semiconductor device of the second pattern image. In this case, even when the measured image and the second pattern image are different in size of visual field, a superimposed image in which these images are coincident with one another in position on the semiconductor device can be prepared.

Further, the matching information may be at least one of the positional information, rotational information, and magnification information indicating a correlation of the first pattern image and the second pattern image. Use of such matching information allows simply obtaining the positional relationship of the measured image and the second pattern image, and simply acquiring a superimposed image based thereon.

Still further, the measured image may be at least one of the thermal emission image, photo emission image, electrical quantity change image, photoinduced current image, pass/fail information image, phase image, amplitude image, and I/Q image of the semiconductor device. Furthermore, the second pattern image may be any of the reflection image, transmission image, MOBIC image, and CAD layout image of the semiconductor device.

INDUSTRIAL APPLICABILITY

The present invention is used for application of an image processing method, image processing apparatus, and image processing program, and can accurately generate a superimposed image of a measured image such as a photo emission or thermal emission of a semiconductor device and its pattern image.

REFERENCE SIGNS LIST 1A, 1B, 1C, 1D . . . observation system, 3 . . . infrared camera, 3C . . . photodetector, 5 . . . two-dimensional camera, 7 . . . lighting device, 7C . . . laser light source, 9 . . . dichroic mirror, 9B . . . mirror, 9C . . . laser scanning means, 11 . . . beam splitter, 13 . . . objective lens, 15 . . . stage, 17 . . . computer, 19 . . . tester, 19C . . . electric signal detecting means, 25 . . . objective lens switching means, 27 . . . storage unit, 29 . . . image analysis unit, 31 . . . image processing unit, 33 . . . control unit, 35 . . . power supply, $G_1$ . . . measured image, $G_2$ . . . first pattern image, $G_3$ . . . second pattern image, $G_4$ . . . superimposed image, $P_3$ . . . shape information, S . . . semiconductor device.

What is claimed is:

1. A method for superimposing a measured image measured from a semiconductor device and a pattern image showing a pattern of the semiconductor device, the method comprising:

acquiring the measured image and a first pattern image showing a pattern of the semiconductor device corresponding to the measured image;

acquiring a second pattern image showing a pattern of the semiconductor device;

acquiring matching information indicating a correlation of the first pattern image and the second pattern image based on the first pattern image and the second pattern image, wherein the matching information is obtained by adjusting an image size of at least either one of the first pattern image and the second pattern image based on a ratio of a first size of visual field indicating a range on the semiconductor device of the first pattern image to a second size of visual field indicating a range on the semiconductor device of the second pattern image; and superimposing the second pattern image and the measured image based on the matching information to acquire a superimposed image.

2. The method according to claim 1, wherein
the acquiring matching information step comprises
extracting first shape information from the first pattern image,
extracting second shape information from the second pattern image, and
acquiring the matching information based on the first shape information and the second shape information.

3. The method according to claim 1, wherein
the matching information is at least one of positional information, rotational information, and magnification information indicating a correlation of the first pattern image and the second pattern image.

4. The method according to claim 1, wherein
the measured image is at least one of a thermal emission image, a photo emission image, an electrical quantity change image, an photoinduced current image, a pass/fail information image, a phase image, an amplitude image, and an In-phase/Quadrature (I/Q) image of the semiconductor device.

5. The method according to claim 1, wherein the second pattern image is any of a reflection image, a transmission image, a multiphoton absorption (MOBIC) image, and a computer-aided design (CAD) layout image of the semiconductor device.

6. A system for superimposing a measured image measured from a semiconductor device and a pattern image showing a pattern of the semiconductor device, the system comprising:

a storage configured to store a measured image, a first pattern image data showing a first pattern image of the semiconductor device corresponding to the measured image, and a second pattern image data showing a second pattern image of the semiconductor device;

an image analyzer configured to acquire matching information indicating a correlation of the first pattern image and the second pattern image based on the first pattern image data and the second pattern image data, wherein the image analyzer acquires the matching information by adjusting an image size of at least either one of the first pattern image and the second pattern image based on a ratio of a first size of visual field indicating a range on the semiconductor device of the first pattern image to a second size of visual field indicating a range on the semiconductor device of the second pattern image; and an image processor configured to superimpose the second pattern image and the measured image based on the matching information to acquire a superimposed image.

7. The system according to claim 6, wherein
the image analyzer extracts first shape information from the first pattern image, extracts second shape information from the second pattern image, and acquires the matching information based on the first shape information and the second shape information.

8. The system according to claim 6, wherein
the matching information is at least one of positional information, rotational information, and magnification information indicating a correlation of the first pattern image and the second pattern image.

9. The system according to claim 6, wherein
the measured image is at least one of a thermal emission image, a photo emission image, an electrical quantity change image, an photoinduced current image, a pass/fail information image, a phase image, an amplitude image, and an In-phase/Quadrature (I/Q) image of the semiconductor device.

10. The system according to claim 6, wherein
the second pattern image is any of a reflection image, a transmission image, a multiphoton absorption (MOBIC) image, and a computer-aided design (CAD) layout image of the semiconductor device.

11. A non-transitory storage medium storing an image processing program for superimposing a measured image measured from a semiconductor device and a pattern image showing a pattern of the semiconductor device, the image processing program causing
a computer to function as:

an image analyzer configured to, based on a first pattern image showing a pattern of the semiconductor device corresponding to the measured image and a second pattern image showing a pattern of the semiconductor device, acquire matching information indicating a correlation of the first pattern image and the second pattern image, wherein the image analyzer acquires the matching information by adjusting an image size of at least either one of the first pattern image and the second pattern image based on a ratio of a first size of visual field indicating a range on the semiconductor device of the first pattern image to a second size of visual field indicating a range on the semiconductor device of the second pattern image; and an image processor configured to superimpose the second pattern image and the measured image based on the matching information to acquire a superimposed image.

12. A method for superimposing a measured image measured from a semiconductor device and a pattern image showing a pattern of the semiconductor device, the method comprising:
- acquiring the measured image and a first pattern image showing a pattern of the semiconductor device corresponding to the measured image;
- acquiring a second pattern image showing a pattern of the semiconductor device;
- acquiring matching information indicating a correlation of the first pattern image and the second pattern image based on the first pattern image and the second pattern image, wherein the matching information is based on a result of a shape matching process and wherein the shape matching process is done by acquiring low-resolution images of both or one of the first pattern image and the second pattern image at a plurality of resolutions, and matching one of the first pattern image and the second pattern image with the other in sequence from images of low resolution to images of high resolution; and
- superimposing the second pattern image and the measured image based on the matching information to acquire a superimposed image.

13. A system for superimposing a measured image measured from a semiconductor device and a pattern image showing a pattern of the semiconductor device, the system comprising:
- a storage configured to store a measured image, a first pattern image data showing a first pattern image of the semiconductor device corresponding to the measured image, and a second pattern image data showing a second pattern image of the semiconductor device;
- an image analyzer configured to acquire matching information indicating a correlation of the first pattern image and the second pattern image based on the first pattern image data and the second pattern image data, wherein the matching information is based on a result of a shape matching process and wherein the shape matching process is done by acquiring low-resolution images of both or one of the first pattern image and the second pattern image at a plurality of resolutions, and matching one of the first pattern image and the second pattern image with the other in sequence from images of low resolution to images of high resolution; and
- an image processor configured to superimpose the second pattern image and the measured image based on the matching information to acquire a superimposed image.

* * * * *